3,350,265
AQUEOUS POLYMERIC LATEX WITH SILVER AND SODIUM HYPOCHLORITE, HYDROGEN PEROXIDE, OR FORMALDEHYDE GERMICIDES
David Rubinstein, Brookline, and James Healy, Bedford, Mass., assignors to W. R. Grace & Co., Cambridge, Mass., a corporation of Connecticut
No Drawing. Filed Jan. 4, 1966, Ser. No. 518,543
4 Claims. (Cl. 167—38.6)

This invention relates to novel antimicrobial compositions and more particularly to antimicrobial compositions for use in providing protection from spoilage to aqueous polymeric dispersions.

This application is a continuation-in-part of application Ser. No. 333,721, filed Dec. 26, 1963, now abandoned.

One object of this invention is to provide protection against spoilage in aqueous polymeric dispersions by means of a combination of germicides.

The term "germicide" as used herein is intended to refer to a chemical agent that kills bacteria (microorganisms). Since the precise mechanism of the novel compositions of the present invention acting on microorganisms is not known, the term "germicide" is also intended to denote the continued suppression of the agents of spoilage to a level below the level of detection by the testing methods employed herein. This bacetriostatic action denotes a condition wherein bacteria are not necessarily killed but are prevented from multiplying.

Aqueous polymeric dispersions or latices are well known to the art. They are generally prepared by the emulsion polymerization of the particular polymer. The latex constitutes a continuous aqueous phase wherein particles of polymer are suspended. The aqueous polymeric latices are employed as surface coatings such as paints and paper coatings, in textile treatment, adhesives, leather finishes, fabric impregnants and rug backing. Such polymeric dispersions are generally supplied at a total solids of around 50%. The term "dispersion" and "latex" are used interchangeably herein.

Aqueous polymeric latices such as polyvinyl acetate latices have been found to be susceptible to spoilage as a result of the growth and multiplication of various organisms in the latices during storage. The spoilage generally manifests itself first as colored specks on the surface of the dispersion which subsequently develops an oily appearance. The above-described visual phenomena are accompanied by a musty odor which becomes stronger and more objectionable with time. Such conditions of spoilage render the latices unsuitable for further processing to provide an end product. It is also undesirable to permit the introduction of even incipient microbial contamination into products utilizing polymeric latices such as adhesives.

Since it is impractical to attempt to maintain sterile conditions in the dispersions during processing, packaging, shipping, storage, and final end use, it became desirable, therefore, to provide protection against such spoilage by the addition of suitable germicides which will destroy any microorganisms which may be initially present in the polymeric material and also to provide sustained protection over an extended period of time against further contamination.

Several factors make the use of well-known germicides at effective levels undesirable or unsuitable for providing protection to such polymeric materials. For example, formaldehyde, a well-known and generally effective germicide, if used in an effective amount in the polymeric dispersions may impart a characteristic odor to both the emulsion and the finished product which utilizes the emulsion. Hydrogen peroxide at effective levels may create unstable viscosity conditions in polymeric systems. A relatively high concentration of a bacteriostatic metal, as well as contributing appreciably to the cost, may also introduce an undesirable color into the product.

It is desirable, therefore, that any suitable germicidal system for aqueous polymeric dispersions must meet the following requirements:

(1) It should not add appreciably to the emulsion cost;
(2) It should not have no adverse effect upon the polymer or the dispersion properties, e.g., odor, color, or viscosity;
(3) It must not be reactive with any processing materials which may be combined with the emulsion;
(4) It should be water-soluble or readily dispersible in the aqueous phase of the emulsion; and
(5) It must conform to Food and Drug Administration regulations for the specific application.

By means of the present invention protection may now be provided to polymeric dispersion systems by the use of a combination of germicidal materials whose individual concentration level is below the threshold of effectiveness and which fulfill the aforementioned criteria. Sustained and effective protection can be provided by combining, in a single system, at least two germicidal materials, which, if used singly at the same concentration level, would not provide the desired protection.

Protection is afforded aqueous polymeric dispersion by adding to said dispersion an aqueous composition comprising silver and a second germicidal material, preferably an oxidizing agent, a chlorine releasing agent, formaldehyde, or a quaternary ammonium compound. Particularly preferred are oxidizing agents and formaldehyde.

The preferred oxidizing agents are sodium hypochlorite and hydrogen peroxide.

Suitable chlorine release agents are calcium hypochlorite, N-chloroamines and N-chloroamides. It should be noted that certain materials such as sodium hypochlorite may be classified as both oxidizing agents and chlorine releasing agents.

The term "formaldehyde" as used herein is intended to include materials which will provide formaldehyde in the emulsion as well as the chemical compound $H_2C=O$ itself. As examples of such formaldehyde-providing compounds, mention may be made of hexamethylene-tetramine, paraformaldehyde and sodium formaldehyde sulfoxylate. Other aldehydes, used in conjunction with silver at minimum odor levels, may also be suitable for use in the present invention. Dialdehydes are preferably not used in certain polymeric dispersions if gelation may result from the addition of such materials.

Suitable quaternary ammonium compounds are long chain ($C_8$–$C_{18}$) alkyl dimethylbenzyl ammonium chloride, diisobutyl cresoxy ethoxyethyl dimethylbenzyl ammonium chloride and 3-chloromethyl-5 - alkyl - benzyl "coco"* dimethyl ammonium chloride. Since such materials are cationic, care should be taken to avoid their use in polymeric dispersions which may be introduced into anionic systems. While the germicidal action may not be completely destroyed, other properties of the system which are dependent on the anionic surfactant may be altered.

Silver may be introduced into the dispersion in any desirable form. Preferably, an aqueous solution of silver nitrate is added to the polymer dispersion. It is believed that salts such as the sulfate and the chloride are formed therein. When the silver is being added to a latex emulsified with the salt of a fatty acid, it is preferably added in the form of a finely divided dispersion of silver chloride to prevent the formation of a silver soap. It has also been found that it is not sufficient to merely satisfy the solu- ---
* Coconut oil fatty acids.

bility product of the silver salt; increased silver concentration provides a greater degree of protection.

Particularly preferred compositions because of their high degree of effectiveness of protection which is afforded aqueous polymeric latices are aqueous compositions comprising silver and, as a second germicidal material, formaldehyde, sodium hypochlorite, or hydrogen peroxide. Silver is employed at a level of between 2 and 10 parts per million (p.p.m.) of the aqueous phase on a weight basis. Sodium hypochlorite is employed at a level of between 40 and 240 (p.p.m.). Hydrogen peroxide is employed at a level of between 100 and 450 (p.p.m.). Formaldehyde is employed at a level of between 50 and 450 (p.p.m.).

An examination of polyvinylacetate emulsions which showed contamination sometime prior to the end use revealed two distinct organisms. The first was an ellipsoidal yeast resembling saccharomyces and 5 microns long and 1.5 to 2 microns wide. The other was a gram-positive, spore-forming baccilus, 2 to 3 by 1 to 1.5 microns in size. The bacteria is aerobic in nature and exhibits maximum bacterial growth rate at room temperature. These microorganisms were considered representative, and the effectiveness of germicidal compositions was measured against these microorganisms.

The effectiveness of the antimicrobial compositions of the present invention was determined in the following manner:

A 50 g. sample of a polymeric dispersion containing an antimicrobial composition was placed in a 4-ounce closed container which was half-filled, to which was added, with stirring, one cubic centimeter of an inoculant prepared by mixing equal volumes of a polyvinyl acetate emulsion contaminated with the above-described aerobic gram-positive bacillus and a polyvinyl acetate dispersion contaminated with the above-described ellipsoidal yeast. After inoculation the container was covered and inspected visually and by aroma to determine odor development at selected intervals. Comparison was also generally made with at least one control sample according to the following schedule:

|  | Antimicrobial Additive | Inoculant |
| --- | --- | --- |
| Sample A | No | No. |
| Sample B | No | Yes. |
| Sample C | Yes | Yes. |
| Sample D | Yes | No. |

The failure of the antimicrobial composition was measured by the period of time which elapsed from the time of inoculation until the first detection of any unpleasant, noncharacteristic odor indicating the presence of microorganisms. Since it was found that the particular microorganisms involved multiplied most rapidly at room temperature, incubation was generally carried out at room temperature.

The above-described laboratory evaluation test gives a highly accurate and relatively rapid evaluation of the germicides in the dispersions. Approximately 95 percent of all batches of polymeric dispersions that are going to show spoilage have been found to show it within a few days to two weeks and some up to a month, after bacterial contamination. A few isolated batches may not show spoilage until sometime up to 3 to 4 months. Therefore, a relatively short evaluation period in the laboratory gives good indication of the degree of protection which has been afforded the dispersion.

The concentration of the ingredients described herein was measured by parts-per-million (p.p.m.) of the aqueous phase on a weight basis.

The concentration of silver metal necessary to provide protection to an inoculated latex is as little as 2 p.p.m. when used in conjunction with a second germicidal material. However, a concentration of 32 p.p.m. of silver used alone is necessary to provide protection to the same latex. A dispersion to which 2 p.p.m. has been added has shown an extensive degree of contamination and spoilage after only two weeks; a degree of spoilage essentially comparable to an inoculated, unprotected sample of dispersion. The use of 8 and 15 p.p.m. of silver alone in inoculated dispersion showed spoilage after one week and four months respectively. Silver, when used with a second germicidal material within the scope of this invention, may be used effectively at levels as low as 2 p.p.m. In providing protection to polyvinyl acetate dispersions, about 2 to 10 p.p.m. of silver with a second germicide has been found to provide the desired degree of protection while at the same time fulfilling the requirements for the antimicrobial composition set forth above. Amounts in excess of 10 are not employed because of the undesirable introduction of relatively high levels of silver into the product with its attendant difficulties.

The upper limits of formaldehyde is readily apparent and is determined by the unpleasant, characteristic odor of the particular compound. Therefore, there is an urgent and compelling need which dictates the use of as little formaldehyde as possible in dispersions. Hexamethylene tetramine alone provides long-term germicidal protection to a particular inoculated dispersion at 1250 p.p.m., but the dispersion develops, on long standing, a characteristic formaldehyde odor. At 630 p.p.m. only a slight formaldehyde aroma is noticeable in the same dispersion, but spoilage occurs within two weeks. Sodium formaldehyde sulfoxylate, when used alone in an inoculated dispersion, has been found effective; however, there is a possibility of the development of objectionable sulfur odors ($H_2S$ or $SO_2$). Similarly, with formaldehyde as the sole germicidal material, a level of 450 p.p.m. will generally not prevent spoilage from occurring in an inoculated latex. However, 450 p.p.m. is considered borderline from an odor consideration being apparent in the latex; an amount of formaldehyde in excess of 450 p.p.m. is not suitable for employment in the latices. Propionaldehyde and acetaldehyde must generally be used at a concentration of about 2500 p.p.m. to prevent spoilage, but at that level a strong aroma of the aldehyde is given off from the dispersion. By means of the present invention, adequate, long-lasting protection against spoilage has been satisfactorily provided to dispersions by using 2 to 10 p.p.m. of silver and 50 to 450 p.p.m. of formaldehyde at an acceptable odor level.

Hydrogen peroxide is well known as an effective germicide, but the possibility of undesirable side effects, e.g., bubbling and viscosity drift, resulting from its use in polymeric latices may provide limitations on the use of relatively high amounts of hydrogen peroxide. Preferably, hydrogen peroxide is used as a 35 percent solution. As the sole germicidal agent, a concentration of 500 p.p.m. has been found necessary to prevent spoilage in an inoculated polyvinyl acetate dispersion; 250 p.p.m. will not provide protection in the same dispersion. At the level necessary for adequate protection, i.e., 500 p.p.m., the aforementioned viscosity drift is observed. It has now been found, however, that as little as 100 p.p.m. of hydrogen peroxide and 2 p.p.m. of a silver compound can provide long-lasting protection from spoilage to a polymeric dispersion without introducing the above-described, undesirable side effects.

Surprisingly, sodium hypochlorite, an extremely active chemical, has been found to be a highly effective germicidal agent when used in combination with a silver compound according to the present invention, without any undesirable effect on the dispersion. It is desirable to add the sodium hypochlorite to the polymer after the emulsion has been cooled but before transfer to storage. A concentration of 40 p.p.m. added to a specific inoculated dispersion has been found inadequate in providing protection against spoilage; however, when used at the 40 p.p.m.

level with a silver compound, effective protection is provided to the same dispersion. Amounts in excess of 240 p.p.m. are precluded from employment in the compositions because of the odor problems introduced into the latices.

It must be understood that while the above-mentioned concentrations represent effective amounts for most polymeric dispersions, the polymerization formulation, reaction time, and temperature, the varying conditions and degree of contamination during processing, shipping, and use to which the dispersion is subject indicates that a proportionally greater or less amount of antimicrobial composition may be necessary to provide the desired degree of protection.

The following table illustrates graphically the novel and unexpected germicidal effects of the compositions of the present invention. The tests were carried out on 50 cc. samples of polyvinyl acetate emulsions inoculated with one cc. of the above-described inoculant. The concentration of additive is in parts-per-million. The samples were examined weekly. Since the emulsions were not all taken from the same batch, the batches are designated A, B, and C.

As examples of other aqueous polymeric systems, mention may be made of styrene/butadiene, polyvinyl chloride, polyvinylidine chloride, polyvinyl acetate copolymers, acrylates, and acrylonitrile latices.

The time of addition of the antimicrobial composition of the present invention to the polymeric dispersions is not critical. Preferably, the silver is added to the emulsion in the reactor, and the other germicidal component, e.g., sodium hypochlorite, is added after the latex has been cooled, which is generally carried out in a cooling tank rather than the reactor. It is desirable, however, to add the germicidal composition to the latex as soon as possible in order to provide the optimum degree of protection.

It should also be understood that the novel antimicrobial compositions of the present invention are not limited to use in aqueous polymeric dispersions but may be used in polymeric or nonpolymeric aqueous solutions wherever protection from spoilage is desired, particularly where cost or other considerations require that extremely small amounts of germicidal materials be used while at the same time providing efficient protection against microbial contamination. The novel antimicrobial composi-

| Polymer Batch | Silver (as the nitrate) | Hydrogen Peroxide | Formaldehyde | Sodium Hypochlorite | Result |
|---|---|---|---|---|---|
| A | 0 | 0 | 0 | 0 | Spoilage—1 week (blank). |
|   | 2 |   |   |   | Spoilage—2 weeks. |
|   |   | 100 |   |   | Spoilage—1 week. |
|   |   |   | 450 |   | Do. |
|   | 2 | 100 |   |   | Resistant.* |
|   | 2 |   | 450 |   | Do. |
| B |   |   |   | 40 | Spoilage—1 week. |
|   | 8 |   |   | 40 | Resistant.* |
| C | 0 |   |   |   | Spoilage—1 week. |
|   | 5 |   |   |   | Do. |
|   | 15 |   |   |   | Spoilage—4 months. |
|   | 30 |   |   |   | Resistant.* |

*Test terminated with no evidence of spoilage after 1 year.

The following compositions illustrate preferred antimicrobial compositions within the scope of the present invention. The concentration of material is in parts-per-million based on the weight of the aqueous phase of the dispersion. Antimicrobial compositions of the present invention are preferably added to the polymer systems as aqueous solutions.

*Composition 1*

|  | p.p.m. |
|---|---|
| Silver | 2 |
| Hydrogen peroxide | 100 |

*Composition 2*

| Silver | 2 |
|---|---|
| Formaldehyde | 450 |

*Composition 3*

| Silver | 8 |
|---|---|
| Sodium hypochlorite | 40 |

It should be understood that the concentration of the germicidal compositions of the present invention may be varied depending upon the extent of contamination which may be present in the polymeric systems. However, it is believed that the amount of inoculant used in the above-described evaluation procedure is an extremely large amount and that the test is particularly severe. It may also be desirable to use an amount of germicidal composition greater than the determined effective amount in order to provide insurance against any serious contamination that may be introduced in processing or during extended storage of the polymeric systems or resulting from damage to the containers.

It should be understood that the novel antimicrobial compositions of the present invention are effective in other polymeric systems as well as polyvinyl acetate.

tions of the present invention may also be used for general germicidal and sterilizing applications, preferably in aqueous solutions.

Since certain changes may be made in the above product and process without departing from the scope of the invention herein involved, it is intended that all matter contained in the above description shall be interpreted as illustrative and not in a limiting sense.

What is claimed is:

1. A novel composition comprising an aqueous polymeric latex and an antimicrobial composition, said antimicrobial composition consisting essentially of 2 to 10 parts-per-million of silver and a second germicide selected from the group consisting of 40 to 240 parts-per-million of sodium hypochlorite, 100 to 450 parts-per-million of hydrogen peroxide, and 50 to 450 parts-per-million of formaldehyde, said antimicrobial composition being based on the weight of the aqueous phase of said latex.

2. A composition as defined in claim 1 wherein said polymeric latex is a polyvinyl acetate latex.

3. The composition as defined in claim 1 wherein silver is in the form of silver nitrate.

4. A composition as defined in claim 1 wherein said germicidal contains 2 parts-per-million of silver and 150 parts-per-million of formaldehyde.

References Cited

UNITED STATES PATENTS 2,951,766   8/1960   White _____ 106—15

LEWIS GOTTS, *Primary Examiner.*

S. ROSE, *Assistant Examiner.*